US006839083B2

(12) United States Patent
Hamamoto et al.

(10) Patent No.: US 6,839,083 B2
(45) Date of Patent: Jan. 4, 2005

(54) MONITORING DEVICE FOR SECURITY IN AUTOMATIC TELLER MACHINE

(75) Inventors: Yoshiaki Hamamoto, Komaki (JP); Noriaki Kawamoto, Owariasahi (JP)

(73) Assignee: Hitachi, Ltd., Tokyo (JP)

( * ) Notice: Subject to any disclaimer, the term of this patent is extended or adjusted under 35 U.S.C. 154(b) by 483 days.

(21) Appl. No.: 09/855,690

(22) Filed: May 16, 2001

(65) Prior Publication Data

US 2002/0000913 A1 Jan. 3, 2002

(30) Foreign Application Priority Data

May 18, 2000 (JP) ....................................... 2000-145967

(51) Int. Cl.[7] ................................................. H04N 7/18
(52) U.S. Cl. ...................................................... 348/150
(58) Field of Search ......................... 348/143, 150–156, 348/159; H04N 7/18

(56) References Cited

U.S. PATENT DOCUMENTS 5,726,430 A * 3/1998 Ruggirello .................. 235/379
5,751,346 A * 5/1998 Dozier et al. ............... 348/153
5,923,363 A * 7/1999 Elberbaum .................. 348/156
6,068,184 A * 5/2000 Barnett ........................ 235/379
6,508,397 B1 * 1/2003 Do ............................. 235/379
6,552,850 B1 * 4/2003 Dudasik ..................... 359/501

FOREIGN PATENT DOCUMENTS

JP 4-218888 8/1992
JP 5-62050 3/1993

* cited by examiner

*Primary Examiner*—Nhon Diep
(74) *Attorney, Agent, or Firm*—Mattingly, Stanger & Malur, P.C.

(57) ABSTRACT

A monitoring device for security in automatic teller machine, wherein a security monitoring unit and a security data recording unit are robust in structure so that they are not easily destructed. Even if the automatic teller machine itself is stolen and a commercial power source is shut down, the security monitoring unit and the security data recording unit can be operated with a backup power supply unit to wirelessly transmit security information, thereby making it possible to keep track of where the automatic teller machine is located.

11 Claims, 3 Drawing Sheets

MONITORING DEVICE FOR SECURITY IN AUTOMATIC TELLER MACHINE

BACKGROUND OF THE INVENTION

The present invention relates to a monitoring device for security in an automatic teller machine which comprises a plurality of processing units or processing mechanisms, such as a machine which handles cash or articles, for example, a cash dispenser, an automatic vending machine and so on, and more particularly to a monitoring device for security in an automatic teller machine which can improve the reliability of the machine for the security by continuously recording and monitoring video and audio at the time a theft takes place.

JP-A-05-62050 discloses a prior art automatic teller machine comprised of a plurality of processing units and processing mechanisms, which has an imager unit mounted therein for improving the security of a removable cash receiving box.

However, the prior art has a problem in that it is not effective if the entire automatic teller machine is stolen, and that it cannot track or monitor if the machine is powered off or if a communication line connected thereto is cut.

SUMMARY OF THE INVENTION

It is a first object of the present invention to provide a monitoring device for security in an automatic teller machine which is capable of continuing to monitor for security with a back-up power supply, even if it is in a power-off state or even if it is powered down, by detecting vibrations, heat and so on, experienced by the machine.

It is a second object of the present invention to provide a monitoring device for security in an automatic teller machine which is capable of improving the reliability for the security of the machine by continue to monitor, record and transmit video and audio even if the machine itself has been stolen.

To achieve the above object, according to the present invention, a monitoring device for security in an automatic teller machine comprises a plurality of processing units, each of which executes predetermined processing in accordance with processing requirements. The monitoring device comprises a security monitoring unit which is started in response to the output of a security sensing unit for sensing a phenomenon indicative of the need for security, a security monitoring controller for acquiring monitoring information from the security monitoring unit to record the monitoring information in a recording unit, and means operative when the automatic teller machine is powered off, e.g., when a power cord plug of the automatic teller machine is removed from a receptacle, for supplying the security monitoring controller with the power from a backup power supply unit in place of a machine power supply unit connected to a commercial power source, so that the security monitoring can be continued even if the automatic teller machine is powered off.

The security monitoring unit monitors both the front side and the back side of the automatic teller machine for security on video and audio basis.

The security monitoring controller further has a security data communication unit for wirelessly communicating the monitoring information to the outside. The security monitoring controller normally transmits the monitoring information through a line controller of the automatic teller machine to the outside via a line, while, upon occurrence of a line trouble, the security monitoring controller wirelessly transmits the monitoring information through the security data communication unit to the outside.

When the automatic teller machine is powered off, e.g., when a power cord plug of the automatic teller machine is removed from a receptacle, the backup power supply unit is used so that the security monitoring controller normally transmits the monitoring information through the line controller of the automatic teller machine to the outside via the line, while upon occurrence of a line trouble, the security monitoring controller wirelessly transmits the security information through the security data communication unit to the outside.

DETAILED DESCRIPTION OF THE EMBODIMENTS

In the following, one embodiment of the present invention will be described with reference to the drawings.

While the present invention can be applied to any of automated trading systems which handle cash or articles such as automatic teller machine, automatic vending machines and so on, the following description will be made on an embodiment in which the present invention is applied to an automatic teller machine.

Figure 1:
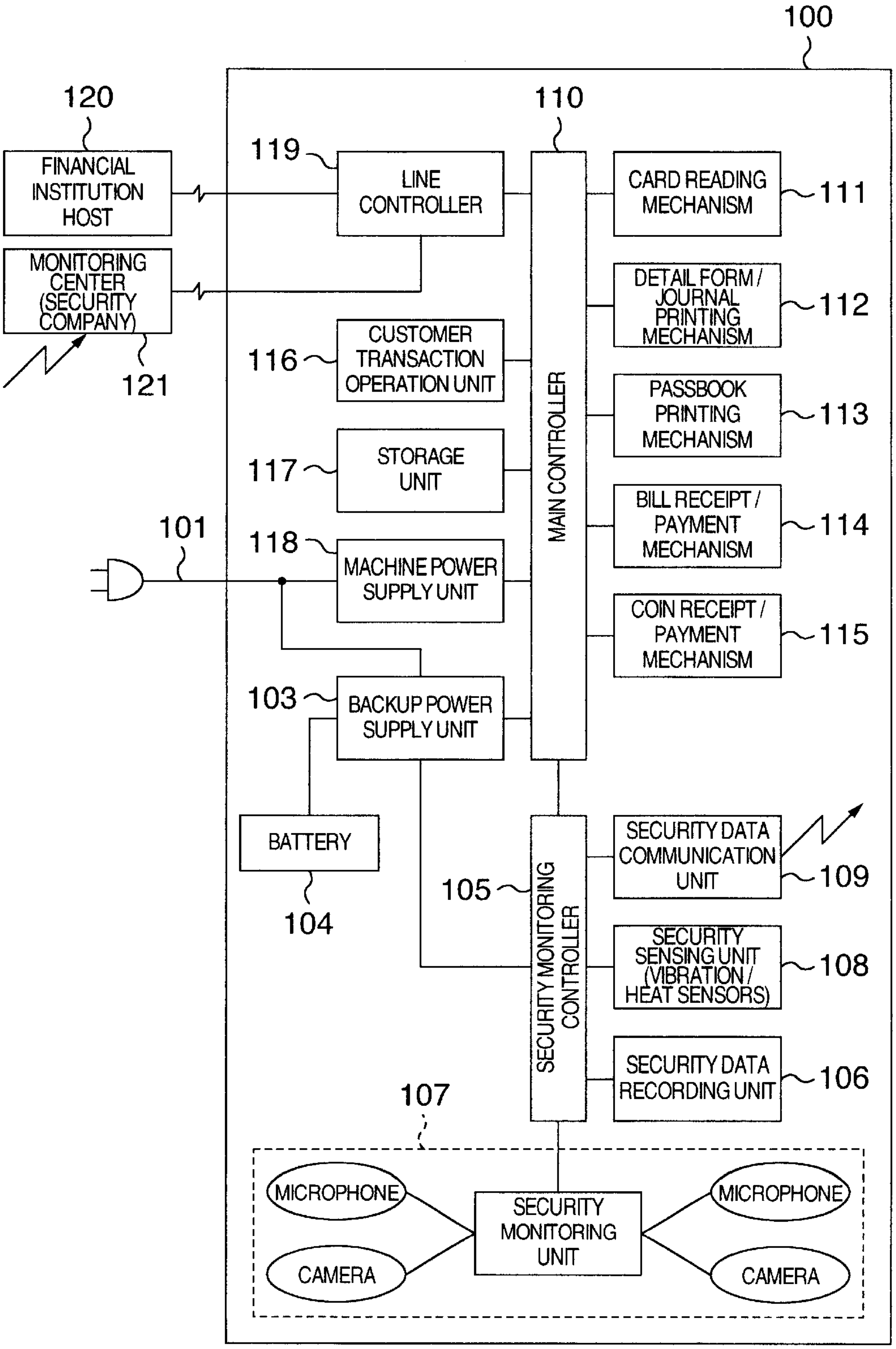
FIG. 1 is a block diagram illustrating the configuration of an embodiment of an automatic teller machine to which the present invention is applied.

FIG. 1 is a block diagram illustrating the configuration of an embodiment of the automatic teller machine to which the present invention is applied.

The automatic teller machine 100 in this embodiment comprises a power supply cable 101 for receiving a commercial alternating current (AC) power supply; a machine power supply unit 118 for converting an AC voltage to a direct current (DC) voltage for supplying the DC voltage to components within the automatic teller machine 100; a line controller 119 for communicating data with a financial institution host 120 and a center monitoring unit (in a security company) 121; and a main controller 110. The main controller 110 controls a customer transaction operation unit 116 through which a customer performs operations associated with transactions; a storage unit 117 for storing contents of transactions and so on; a card reading mechanism 111 for controlling card reading; a detail form/journal printing mechanism 112 for controlling the printing on a detail form/journal; a passbook printing mechanism 113 for controlling the printing on a passbook; a bill receipt/payment mechanism 114 for controlling receipt and payment of bills; and a coin receipt/payment mechanism 115 for controlling receipt and payment of coins.

The automatic teller machine 100 further comprises a security sensing unit 108 for sensing phenomena (vibration, heat and so on) indicative of the need for security; a security monitoring unit 107 for monitoring a situation by means of a video camera and a microphone when vibrations, heat or the like is sensed; a security monitoring controller 105 for controlling the units associated with the security monitoring; and a wireless security data communication unit 109.

When the security monitoring controller 105 responsible for controlling the security monitoring receives an output from the security sensing unit 108, the security monitoring controller 105 first confirms, from the presence or absence of a response to a transmission, whether or not the main controller 110 and the line controller 119 are connected to a security company (monitoring center) 121. If connected, monitoring information such as video and audio is transmitted to the security company 121 through the main controller 110 and the line controller 119 via a line.

The main controller 110 is normally supplied with a required voltage by the machine power supply unit 118.

When the machine power supply unit 118 is turned off, the main controller 110 is supplied with the voltage by the backup power supply unit 103 which converts an AC voltage from the power supply cable 191 supplied with commercial AC power to a DC voltage, and supplies the DC voltage to the main controller 110. The backup power supply unit 103 has a switching function for switching a power supply circuit when the AC voltage is shut down such that the voltage is immediately supplied from a battery 104. Therefore, if no AC voltage is supplied from the power supply cable 101 (for example, due to power interruption, cut power supply cable 101, or the like), or if the backup power supply unit 103 fails, the main controller 110 is supplied with the voltage from the battery 104. The security monitoring controller 105 is supplied with a required voltage from the backup power supply unit 103.

When no response is returned even if the main controller 110 transmits a query signal to the monitoring center 121, this means that a trouble occurs on the line which connects the machine 100 to the monitoring center 121. The security monitoring controller 105 determines a line trouble based on whether a response to a query is returned to the main controller 100. If a line trouble has occurred, the security monitoring controller 105 switches the transmission mode from wired transmission to wireless transmission, and causes the security data communication unit 109 to transmit monitoring information such as video and audio.

When the automatic transaction operation managed by the main controller 110 is stopped or paused, the security monitoring controller 105, supplied with the voltage from the backup power supply unit 103, switches the transmission mode from wired transmission to wireless transmission, and causes the security data communication unit 109 to transmit monitoring information such as video and audio.

As described above, if a line trouble occurs, or if vibrations, heat or the like is sensed while the automatic transaction operation is stopped or paused with the line controller 119 remaining in an inoperative state, an automatic call is made to the security company 121 through wireless transmission to transmit monitoring information such as video and audio by the security monitoring unit 107 for monitoring the situation with a video camera and a microphone; the security data recording unit 106 for recording contents of the monitoring; and the security monitoring controller 105 for controlling the security monitoring performed by these units.

Further, even if the power supply cable 101 is cut by a guilty act, the security data communication unit 109 continues to transmit monitoring information such as video and audio, sensed during the guilty act, to the security company 121 through wireless transmission by continuously powering only the units 105–109 associated with the security monitoring from the battery 104, thereby making it possible to sequentially collect information and keep track of the automatic teller machine even if the entire machine has been stolen.

Figure 2:
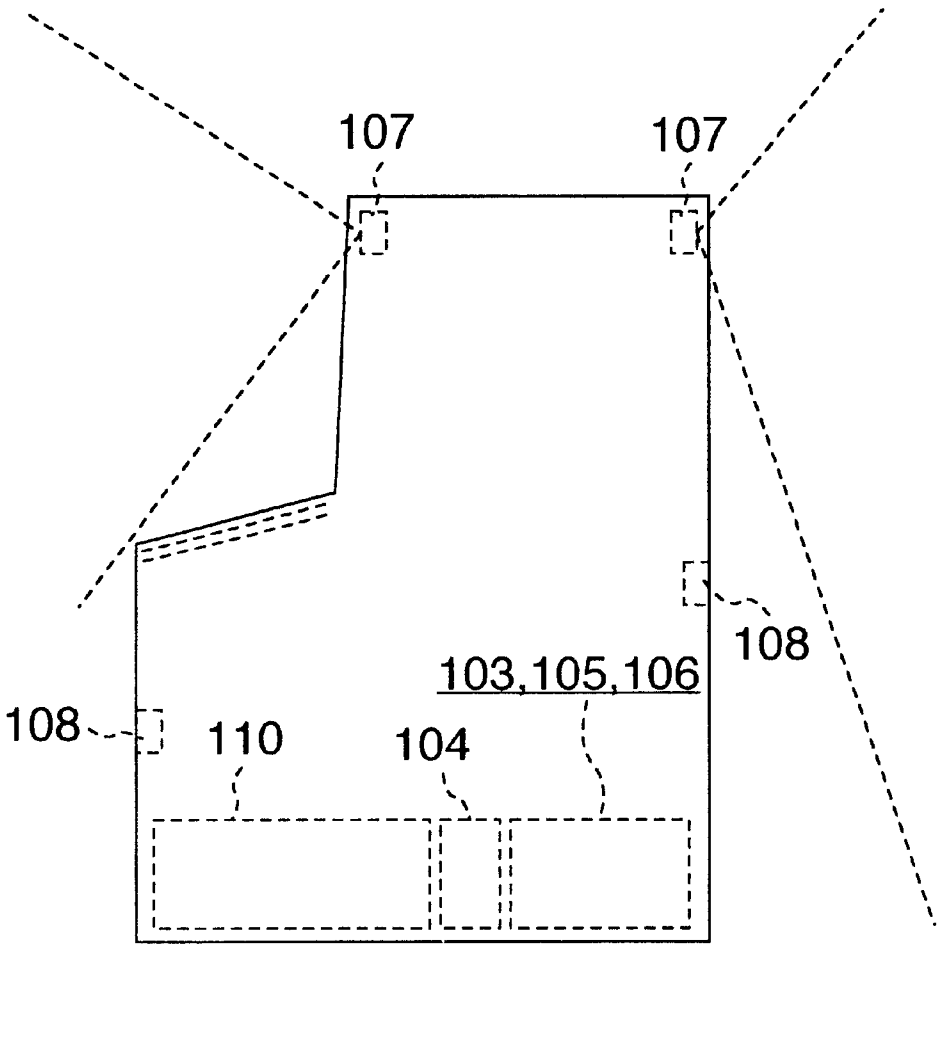
FIG. 2 is a diagram illustrating the layout of the embodiment of the automatic teller machine associated with the monitoring for security.

FIG. 2 is a diagram illustrating the layout of the embodiment of the automatic teller machine associated with the security monitoring.

The automatic teller machine in this embodiment has the security sensing unit 108, arranged in a portion of the machine likely to receive an attach such as front and back surfaces of the housing, for sensing vibrations, heat or the like; and the security monitoring unit 107 arranged at a location at which an attacker(s) can be monitored for monitoring a situation by means of a video camera and a microphone when vibrations, heat or the like is sensed. The security monitoring controller 105 preponderantly monitors a surface which suffers from an attack. More specifically, the automatic teller machine preponderantly records monitoring information on an attacked surface in the security data recording unit 106, and communicates such monitoring information to the security company 121 through the security monitoring controller 105, main controller 110 and line controller 119.

Also, when the security monitoring controller 105 determines a line trouble or an inoperative state of the line controller 119, a wireless-based automatic call is made to the security company 121 by the security data communication unit 109 to transmit monitoring information such as video and audio.

Specifically, when a sufficiently large capacity is ensured for accommodating information sent from the line controller 119 or the security data communication unit 109, it is possible to fully send monitoring information on the front side of the machine and monitoring information on the back side of the machine. However, if the amount of information which can be sent is limited, for example, if the capacity is limited to allow transmission of monitoring information only on one side of the machine, monitoring information on an attacked side is preponderantly recorded and sent to the security company 121. For example, 70% of monitoring information on the attacked side and 30% of monitoring information on the unattacked side are recorded and sent to the security company 121. The percentage of monitoring information on the attacked side and that on the unattacked side allocated for transmission may be based on monitoring time or on the data quality of monitoring information.

In addition, data recorded by the security monitoring controller 105 and the security data recording unit 106 is guarded by a robust housing having a structure hard to break, for example, the structure employed for the voice recorder equipped in an airplane. Therefore, even if the machine itself is stolen, detailed information can be collected by searching monitoring information contained in the security data recording unit 106 of the machine if it is found at some future date after the theft. Particularly, since the units 105–109 associated with the security monitoring and the backup power supply units 103, 104 are constructed such that they are hardly destructed, it is possible to keep track of the automatic teller machine 100 even if the machine itself is stolen. The robust structure may be, for example, the structure for safes, an assembly made of stiff materials, or an integrated structure. As to the camera equipped in the automatic teller machine 100, a pin hole camera or the like should be used such that no one can recognize the camera equipped therein and its position from the outside.

Figure 3:
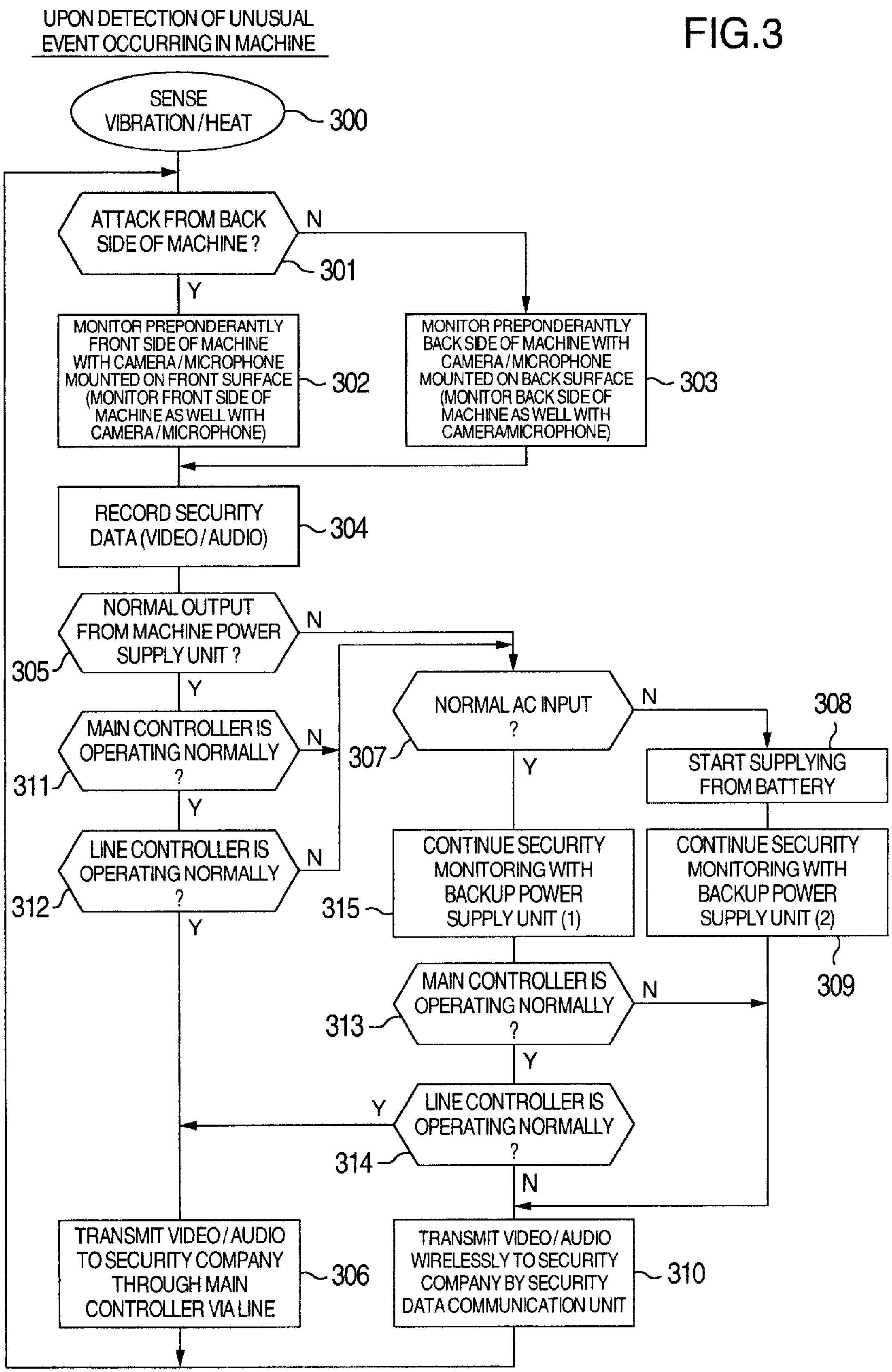
FIG. 3 is a flow chart illustrating the processing which is executed when an unusual event takes place in the automatic teller machine.

FIG. 3 is a flow chart illustrating an embodiment of a processing operation executed by the security monitoring controller 105 when the automatic teller machine 100 experiences an unusual event.

In the following, the operation of the security monitoring controller 105 in the embodiment of FIG. 1 will be described along the flow chart.

When the automatic teller machine 100 senses vibrations, heat or the like from the outside caused by some cause through the sensing unit 108 (step 300), the security monitoring controller 105 determines whether the automatic teller machine 100 is attacked from the back side or from the front side (step 301). Determining an attack from the back side of the machine, a situation around the back side is preponderantly monitored by the camera/microphone 107 mounted on the back surface of the machine, while a situation around the front side of the machine is also monitored on a periodic basis (step 302).

When an attack from the front side of the machine is determined at (step 301), the situation around the front side of the machine is preponderantly monitored by the camera/microphone 107 mounted on the front surface of the machine, while the situation around the back side is also monitored on a periodic basis (step 303).

Also, the monitored information is stored in the security data recording unit 106 under control of the security monitoring controller 105 (step 304).

Next, for determining whether or not the means for transmitting the information under monitoring to the security company 121 is normally operating, the security monitoring controller 105 confirms whether or not the machine power supply unit 118 is delivering a normal output (step 305). When the output is normal, the security monitoring controller 119 next confirms whether or not the main controller 110 is normally operating (step 311). When the main controller 110 is normally operating, the security monitoring controller 105 further confirms whether or not the line controller 119 is normally operating (step 312).

If the determination results at (step 305), (step 311) and (step 312) are all normal, the data recorded at (step 304), i.e., monitoring information (video and audio) is communicated to the security company 121 through the security monitoring controller 105, main controller 110 and line controller 119 (step 306).

If the determination result at any of (step 305), (step 311) and (step 312) is abnormal, the security monitoring controller 105 confirms whether or not the AC voltage is supplied from the machine power supply unit 118 (step 307) by means of the backup power supply unit 103 which is monitoring the output of the machine power supply unit 118 at all times. If no AC voltage is being supplied as determined at (step 307), the power from the battery 104 is supplied only to the security monitoring controller 105 and the units 106–109 associated therewith through the backup power supply unit 103 (step 308), so that the security monitoring unit 107 continues to operate (step 309) and the security data communication unit 109 wirelessly transmits the monitoring information (video and audio) to the security company 121 (step 310).

If the AC voltage is being supplied as determined at (step 307), the AC voltage from the power supply cable 101 is supplied through the backup power supply unit 103 only to the security monitoring controller 105 and units 106–109 associated therewith, main controller 110, and line controller 119 (step 315) without using the battery 104. Then, the security monitoring controller 105 again confirms whether or not the main controller 110 is normally operating (step 313). If the main controller 110 is normally operating, the security monitoring controller 105 further confirms whether or not the line controller 119 is normally operating (step 314).

If the result at (step 314) is normal, the data recorded at (step 304), i.e., the monitoring information (video and audio) is communicated to the security company 121 through the security monitoring controller 105, main controller 110 and line controller 119 (step 306).

If the determination result at any of (step 313) and (step 314) is abnormal, the security data communication unit 109 wirelessly transmits the monitoring information (video and audio) to the security company 121 (step 310).

If the vibrations or heat is sensed even once at (step 300), the processing at (step 301) to (step 314) is repeatedly executed until the security monitoring controller 105 receives monitoring stop information from the security company 121. Here, the monitoring stop information refers to information transmitted by the security company 121 when it determines that the monitoring is no longer required.

If the main controller 110, line controller 119 and line are normal while the AC input is not normal so that the power output from the battery 104 is used, the security monitoring controller 105 may operate a portion of the main controller 110 associated with the line controller 119 with the power output from the battery 104 such that the monitoring information is communicated by the line controller 119 to the security company 121 via the line. However, if any of the main controller 110, line controller 119 and line is not normal, the monitoring information is wirelessly communicated to the security company 121 by the security data communication unit 109.

However, when the layout is changed by a clerk in charge for relocation or the like, a security monitoring release switch provided within the automatic teller machine 100 may be changed over by a special key to release the security monitoring. The special key may be implemented by a key or a secret identification code. In this event, when the security monitoring is resumed associated with the resumed operation of the automatic teller machine at a later time, the security company 121 should be notified that the security monitoring has been resumed. If the security company 121 cannot recognize that the security monitoring has been resumed even after a fixed time period has elapsed, the security company 121 may confirm the automatic teller machine whether it has resumed the operation.

As described above, the predetermined processing can be continued upon detection of an unusual event even if the line of the automatic teller machine is cut or the power to the automatic teller machine is shut down, so that the security management function can be improved for a machine which handles a large amount of cash such as the automatic teller machine.

Also, since the security monitoring processing can be continued by supplying the power from the battery, tracking of the automatic teller machine is facilitated even if the machine is entirely stolen because the security monitoring can be continued.

It should be understood that while the foregoing embodiment has been described in connection with an automatic teller machine, the present invention is not limited to the automatic teller machine but can be applied to any automatic trading systems which handle cash or articles such as a cash dispenser, automatic vending machine and so on.

As described above, according to the present invention, whichever state the automatic teller machine is placed in, any attack from the front or back side thereof can be monitored and monitoring information can be transmitted to the security company, thereby making it possible to sense an unusual event of the automatic teller machine at an early stage and continuously monitor information associated with the unusual event.

As such, even if the automatic teller machine is entirely stolen, by way of example, the security monitoring can be continued, thereby facilitating the tracking operation and improving the reliability of the automatic teller machine for security.

What is claimed is:

1. A monitoring device for security in an automatic teller machine comprising:

a detector for detecting a phenomenon required for security;

a monitoring unit for acquiring information required for security;

a recording unit for recording the information acquired by said monitoring unit;

a security monitoring controller operative when said detector detects said phenomenon to record monitoring information acquired by said monitoring unit; and a backup power supply unit for continuing supply of a voltage by a backup power source when a voltage supplied from a commercial power source is interrupted to maintain a security monitoring function;

a line controller for transmitting said monitoring information to a monitoring center through said security monitoring controller and a wired communication line; and a communication unit for wirelessly transmitting said monitoring information to said monitoring center when transmission through said line controller is not available;

wherein said detector has a plurality of detector parts mounted in different sides of the monitoring device, said monitoring unit has a plurality of monitoring parts mounted in different sides of the monitoring device, and one of said line controller and said communication unit transmits preponderantly the monitoring information acquired by one of said monitoring parts mounted in a side mounting one of the detector parts which detects the phenomenon.

2. The device according to claim 1, wherein said detector is disposed at least one position which is likely to receive an attack.

3. The device according to claim 2, wherein said detector is disposed on at least a front surface of said automatic teller machine.

4. The device according to claim 3 wherein said detector is disposed on at least a back surface of said automatic teller machine.

5. The device according to claim 1, wherein said monitoring unit comprises at least one of a microphone and a television camera.

6. The device according to claim 5, wherein said monitoring unit monitors through a pin hole.

7. The device according to claim 1, wherein said backup power supply unit includes a battery and switches the voltage supplied from the commercial power source to the voltage supplied from said battery when the commercial power source is shut down.

8. The device according to claim 7, wherein said backup power supply unit has a function of converting the voltage from the commercial power source to a direct current voltage to supply the direct current voltage, wherein said backup power supply unit switches the voltage supplied from the commercial power source to the voltage supplied from said battery when the commercial power source is shut down.

9. The device according to claim 1, wherein at least said recording unit is protected by a structure which is difficult to destruct.

10. The device according to claim 9, wherein said detector, said monitoring unit, said recording unit, said security monitoring controller and said backup power supply unit are protected by a structure which is difficult to destruct.

11. The device according to claim 1, wherein said phenomenon required for security is heat or impact.

* * * * *